US009660266B2

United States Patent
Choi et al.

(10) Patent No.: US 9,660,266 B2
(45) Date of Patent: May 23, 2017

(54) LITHIUM SECONDARY BATTERY

(71) Applicant: LG Chem, Ltd., Seoul (KR)

(72) Inventors: Young Geun Choi, Daejeon (KR); Geun Chang Chung, Daejeon (KR); Yourim Yoon, Daejeon (KR); Seung Jae Yoon, Daejeon (KR); Jong Mo Jung, Daejeon (KR); Jonghyun Chae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/423,469

(22) PCT Filed: Nov. 21, 2013

(86) PCT No.: PCT/KR2013/010627
§ 371 (c)(1),
(2) Date: Feb. 24, 2015

(87) PCT Pub. No.: WO2014/081222
PCT Pub. Date: May 30, 2014

(65) Prior Publication Data
US 2015/0303471 A1    Oct. 22, 2015

(30) Foreign Application Priority Data

Nov. 21, 2012  (KR) .................. 10-2012-0132385
Nov. 21, 2013  (KR) .................. 10-2013-0142076

(51) Int. Cl.
*H01M 4/58*     (2010.01)
*H01M 10/0569*  (2010.01)
(Continued)

(52) U.S. Cl.
CPC ......... *H01M 4/5825* (2013.01); *H01M 4/136* (2013.01); *H01M 4/583* (2013.01);
(Continued)

(58) Field of Classification Search
None
See application file for complete search history.

(56) References Cited

U.S. PATENT DOCUMENTS 6,365,301 B1 * 4/2002 Michot .................. C07C 45/46
359/270
7,988,879 B2 8/2011 Park et al.
(Continued)

FOREIGN PATENT DOCUMENTS

CN    101599557 A    12/2009
CN    102237526 A    11/2011
(Continued)

OTHER PUBLICATIONS

International Search Report for Application No. PCT/KR2013/010627 dated Mar. 10, 2014.
(Continued)

*Primary Examiner* — Patrick Ryan
*Assistant Examiner* — Christopher Domone
(74) *Attorney, Agent, or Firm* — Lerner, David, Littenberg, Krumholz & Mentlik, LLP

(57) ABSTRACT

Disclosed is a lithium secondary battery including (i) a cathode active material including a lithium metal phosphate according to Formula 1 below, (ii) an anode active material including amorphous carbon, and (iii) an electrolyte for lithium secondary batteries including a lithium salt and an ether-based solvent, $$Li_{1+a}M(PO_{4-b})X_b \qquad (1)$$

wherein M is at least one selected from the group consisting of Group II to XII metals, X is at least one selected from F, S, and N, $-0.5 \leq a \leq +0.5$, and $0 \leq b \leq 0.1$.

12 Claims, 5 Drawing Sheets

(51) Int. Cl.
  *H01M 4/583*   (2010.01)
  *H01M 10/052*   (2010.01)
  *H01M 10/0568*   (2010.01)
  *H01M 4/587*   (2010.01)
  *H01M 10/0525*   (2010.01)
  *H01M 4/136*   (2010.01)

(52) U.S. Cl.
  CPC ......... *H01M 4/587* (2013.01); *H01M 10/052* (2013.01); *H01M 10/0525* (2013.01); *H01M 10/0568* (2013.01); *H01M 10/0569* (2013.01); *H01M 2220/20* (2013.01); *H01M 2300/0028* (2013.01); *H01M 2300/0037* (2013.01); *Y02E 60/122* (2013.01); *Y02T 10/7011* (2013.01)

(56) References Cited

U.S. PATENT DOCUMENTS

| | | | |
|---|---|---|---|
| 8,153,306 | B2 | 4/2012 | Kim et al. |
| 2002/0150816 | A1 | 10/2002 | Sakai et al. |
| 2005/0287442 | A1 | 12/2005 | Kim et al. |
| 2006/0088761 | A1 | 4/2006 | Ota et al. |
| 2007/0003833 | A1* | 1/2007 | Li ..................... H01M 4/131 429/218.1 |
| 2007/0059598 | A1 | 3/2007 | Yang |
| 2007/0207385 | A1 | 9/2007 | Liu et al. |
| 2008/0138713 | A1 | 6/2008 | Roh et al. |
| 2008/0206628 | A1 | 8/2008 | Honbou |
| 2010/0028783 | A1 | 2/2010 | Nah |
| 2010/0040954 | A1* | 2/2010 | Amine ................ H01G 9/038 429/322 |
| 2010/0081064 | A1 | 4/2010 | Watanabe |
| 2010/0233540 | A1 | 9/2010 | Choy et al. |
| 2010/0239900 | A1* | 9/2010 | Take ................... H01M 2/1653 429/144 |
| 2010/0247990 | A1 | 9/2010 | Ugaji et al. |
| 2010/0261060 | A1 | 10/2010 | Choy et al. |
| 2011/0027651 | A1 | 2/2011 | Sun et al. |
| 2011/0059342 | A1 | 3/2011 | Lee et al. |
| 2011/0076531 | A1 | 3/2011 | Lee et al. |
| 2011/0159360 | A1* | 6/2011 | Hirota ................. H01M 4/624 429/206 |
| 2012/0114982 | A1 | 5/2012 | Mitsuda et al. |
| 2012/0183839 | A1 | 7/2012 | Yuasa et al. |
| 2012/0208092 | A1 | 8/2012 | Ku et al. |
| 2012/0237425 | A1 | 9/2012 | Nishio et al. |
| 2012/0270101 | A1 | 10/2012 | Higashizaki et al. |
| 2013/0147439 | A1 | 6/2013 | Takahashi |
| 2013/0214462 | A1 | 8/2013 | Kikuchi et al. |
| 2013/0216902 | A1 | 8/2013 | Choy et al. |
| 2013/0224117 | A1 | 8/2013 | Royall et al. |
| 2013/0244117 | A1 | 9/2013 | Ishimaru et al. |
| 2013/0244118 | A1 | 9/2013 | Onizuka |
| 2013/0266847 | A1 | 10/2013 | Noguchi et al. |
| 2014/0335426 | A1 | 11/2014 | Kawasoe et al. |

FOREIGN PATENT DOCUMENTS

| | | |
|---|---|---|
| CN | 102290571 A | 12/2011 |
| CN | 102332579 A | 1/2012 |
| CN | 102593518 A | 7/2012 |
| EP | 2562856 A2 | 2/2013 |
| JP | H07326357 A | 12/1995 |
| JP | 2002117908 A | 4/2002 |
| JP | 2006-120485 A | 5/2006 |
| JP | 2008-147153 A | 6/2008 |
| JP | 2008210729 A | 9/2008 |
| JP | 2009104983 A | 5/2009 |
| JP | 2009252497 A | 10/2009 |
| JP | 2009295533 A | 12/2009 |
| JP | 2010086722 A | 4/2010 |
| JP | 2011076820 A | 4/2011 |
| JP | 2012028211 A | 2/2012 |
| KR | 20060049327 A | 5/2006 |
| KR | 20080017289 A | 2/2008 |
| KR | 100863887 B1 | 10/2008 |
| KR | 20100081942 A | 7/2010 |
| KR | 20100109857 A | 10/2010 |
| KR | 20100120089 A | 11/2010 |
| KR | 20110017145 A | 2/2011 |
| KR | 20110117552 A | 10/2011 |
| KR | 20120117234 A | 10/2012 |
| WO | 2010007720 A1 | 1/2010 |
| WO | 2011052533 A1 | 5/2011 |
| WO | 2011115211 A1 | 9/2011 |
| WO | 2011132931 A2 | 10/2011 |
| WO | 2012060219 A1 | 5/2012 |
| WO | 2012070153 A1 | 5/2012 |
| WO | 2012077712 A1 | 6/2012 |
| WO | 2012114415 A1 | 8/2012 |

OTHER PUBLICATIONS

International Search Report for Application No. PCT/KR2013/010625 dated Mar. 7, 2014.

* cited by examiner

LITHIUM SECONDARY BATTERY

CROSS-REFERENCE TO RELATED APPLICATION

This application is a national phase entry under 35 U.S.C. §371 of International Application No. PCT/KR2013/010627, filed Nov. 21, 2013, which claims priority to Korean Patent Application No. 10-2012-0132385, filed on Nov. 21, 2012 and Korean Patent Application No. 10-2013-0142076, filed on Nov. 21, 2013, the disclosures of which are incorporated herein by reference.

TECHNICAL FIELD

The present invention relates to a lithium secondary battery. More particularly, the present invention relates to a lithium secondary battery including:

(i) a cathode active material including a lithium metal phosphate according to Formula 1 below;

(ii) an anode active material including amorphous carbon; and (iii) an electrolyte for lithium secondary batteries including a lithium salt and an ether-based solvent, $$Li_{1+a}M(PO_{4-b})X_b \quad (1)$$

wherein M is at least one selected from the group consisting of Group II to XII metals, X is at least one selected from F, S, and N, $-0.5 \leq a \leq +0.5$, and $0 \leq b \leq 0.1$.

BACKGROUND ART

Demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized. Accordingly, research into secondary batteries, which may meet a variety of requirements, is being actively performed. In particular, there is high demand for lithium secondary batteries having high energy density, high discharge voltage, and output stability.

In particular, lithium secondary batteries used in hybrid electric vehicles must exhibit great output in short time and be used for 10 years or more under a severe condition that charge/discharge is repeated during short time. Therefore, there are necessary requirements for a lithium secondary battery exhibiting superior stability and output characteristics to existing small-sized lithium secondary batteries.

In this connection, existing lithium secondary batteries generally use a lithium cobalt composite oxide having a layered structure, as a cathode and a graphite-based material as an anode. However, $LiCoO_2$ has advantages such as superior energy density and high-temperature characteristics while having disadvantages such as poor output characteristics. Due to such disadvantages, high output temporarily required at abrupt driving and rapid accelerating is provided from a battery and thus $LiCoO_2$ is not suitable for used in hybrid electric vehicles (HEV) which require high output. In addition, due to characteristics of a method of preparing $LiNiO_2$, it is difficult to apply $LiNiO_2$ to actual production processes with reasonable costs. Furthermore, lithium manganese oxides such as $LiMnO_2$, $LiMn_2O_4$, and the like exhibit drawbacks such as poor cycle characteristics and the like.

Accordingly, a method of using a lithium transition metal phosphate as a cathode active material is under study. The lithium transition metal phosphate is widely classified into $Li_xM_2(PO_4)_3$ having a NaSICON structure and $LiMPO_4$ having an olivine structure, and considered as a material having superior stability, when compared with existing $LiCoO_2$. At present, $Li_3V_2(PO_4)_3$ having a NaSICON structure is known and, as compounds having an olivine structure, $LiFePO_4$ and $Li(Mn, Fe)PO_4$ are the most broadly researched. However, due to low electron conductivity of $LiFePO_4$, internal resistance of a battery increases when $LiFePO_4$ is used as a cathode active material and thus polarized potential increases when battery circuits are closed, thereby resulting in reduction of battery capacity.

Meanwhile, a carbon-based active material is mainly used as an anode active material. The carbon-based active material has a very low discharge potential of approximately $-3$ V, and exhibits extremely reversible charge/discharge behavior due to uniaxial orientation of a graphene layer, thereby exhibiting superior electrode cycle life.

An electrode potential of the carbon-based active material is 0 V (Li/Li+) during charging of Li ions and thus may exhibit a potential similar to pure lithium metal. Accordingly, higher energy may be obtained when a cathode and a battery including a lithium transition metal oxide are composed.

Examples of the carbon-based active material include crystalline graphite such as natural graphite, synthetic graphite and the like, and amorphous carbon such as soft carbon, hard carbon and the like. The crystalline graphite has high energy density but relatively poor output characteristics, thereby being not suitable for energy sources for hybrid electric vehicles (HEV) requiring high output. In addition, when an ether-based material is used as an electrolyte, the electrolyte may be decomposed.

Therefore, a lithium secondary battery meeting all of the characteristics such as high output, long cycle life and conservation lifespan, high stability, and the like is preferred as secondary batteries for hybrid electric vehicles (HEV). However, such a lithium secondary battery is still under development.

DISCLOSURE

Technical Problem

The present invention has been made to address the aforementioned problems of the related art and to achieve technical goals that have long been sought.

As a result of a variety of intensive studies and various experiments, the inventors of the present invention confirmed that, when a lithium secondary battery including a predetermined lithium metal phosphate as a cathode active material and amorphous carbon as an anode active material is used and a predetermined ether-based solvent is used as an electrolyte for lithium secondary batteries, desired effects may be accomplished, thus completing the present invention.

Technical Solution

In accordance with one aspect of the present invention, provided is a lithium secondary battery including:

(i) a cathode active material including a lithium metal phosphate according to Formula 1 below;

(ii) an anode active material including amorphous carbon; and (iii) an electrolyte for lithium secondary batteries including a lithium salt and an ether-based solvent, $$Li_{1+a}M(PO_{4-b})X_b \qquad (1)$$

wherein M is at least one selected from the group consisting of Group II to XII metals; X is at least one selected from F, S, and N, −0.5≤a≤+0.5, and 0≤b≤0.1.

As described above, when crystalline graphite and a non-aqueous ether-based solvent are used together, an electrolyte may be decomposed by crystalline carbon.

Accordingly, in the lithium secondary battery according to the present invention, an anode active material including amorphous carbon is used, thereby resolving decomposition of an electrolyte, occurring when crystalline graphite and a non-aqueous ether-based solvent are used together. In addition, when a predetermined lithium metal phosphate is used as a cathode active material, superior output and cycle life is exhibited and thus the lithium secondary battery according to the present invention may be properly used as a secondary battery for, particularly, hybrid electric vehicles.

The electrolyte for the lithium secondary batteries may further include ethylene carbonate (EC). That is, when a mixture of an ether-based solvent and ethylene carbonate (EC) is used as an electrolyte of the present invention, room-temperature output characteristics may be particularly improved.

The ethylene carbonate (EC) may be included in an amount of 1 to 80 wt %, particularly 20 to 60 wt %, based on a total weight of the electrolyte. When the amount of ethylene carbonate is extremely high, ionic conductivity of an electrolyte maybe undesirably reduced due to carbonate having high viscosity.

The ether-based solvent, for example, may be at least one selected from tetrahydrofuran, 2-methyltetrahydrofuran, and dimethyl ether. In particular, the ether-based solvent may be dibutyl ether.

The lithium salt may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, 4-phenylboronic acid lithium, and imides. The concentration of the lithium salt may be 0.5 to 3 M, particularly 0.8 to 2 M, in an electrolyte.

The lithium metal phosphate may be lithium iron phosphate, which has an olivine crystal structure, according to Formula 2 below:

$$Li_{1+a}Fe_{1-x}M'_x(PO_{4-b})X_b \qquad (2)$$

wherein M' is at least one selected from Al, Mg, Ni, Co, Mn, Ti, Ga, Cu, V, Nb, Zr, Ce, In, Zn, and Y, X is at least one selected from F, S, and N, −0.5≤a≤+0.5, 0≤x≤0.5, and 0≤b≤0.1.

When values of a, b and x are outside the above ranges, conductivity is reduced or it is impossible to maintain the olivine structure of the lithium iron phosphate. In addition, rate characteristics are deteriorated or capacity may be reduced.

More particularly, the lithium metal phosphate having the olivine crystal structure may be LiFePO$_4$, Li(Fe, Mn)PO$_4$, Li(Fe, Co)PO$_4$, Li(Fe, Ni)PO$_4$, or the like, more particularly LiFePO$_4$.

That is, the lithium secondary battery according to the present invention uses LiFePO$_4$ as a cathode active material and amorphous carbon as an anode active material, and thus internal resistance increase, which causes low electronic conductivity of LiFePO$_4$, may be resolved, and superior high-temperature stability and output characteristics may be exhibited.

The lithium-containing phosphate may be composed of first particles and/or secondary particles in which first particles are physically aggregated.

An average particle diameter of the first particles may be 1 to 300 nanometers and an average particle diameter of the secondary particles may be 1 to 40 micrometers. Particularly, an average particle diameter of the first particles may be 10 to 100 nanometers and an average particle diameter of the secondary particles may be 2 to 30 micrometers. More particularly, an average particle diameter of the secondary particles may be 3 to 15 micrometers.

When an average particle diameter of the first particles is excessively large, desired improvement of ionic conductivity may not be exhibited. On the other hand, when an average particle diameter of the first particles is excessively small, it is not easy to manufacture a battery. In addition, when an average particle diameter of the secondary particles is excessively large, bulk density is reduced. On the other hand, when an average particle diameter of the secondary particles is excessively small, a process may not be effectively performed.

A specific surface area (BET) of the secondary particles may be 3 to 40 m$^2$/g.

The lithium metal phosphate may be coated with a conductive material to increase electronic conductivity and the conductive material may be at least one from conductive carbon, precious metal, metal, and conductive polymers. In particular, it is desirable to coat the lithium metal phosphate with conductive carbon since conductivity may be effectively improved without dramatic increase in preparation costs and weights.

The conductive carbon may be 0.1 to 10 wt %, particularly 1 to 5 wt %, based on a total weight of the cathode active material. When the amount of the conductive carbon is excessively large, the amount of the lithium metal phosphate is relatively reduced, thereby deteriorating overall characteristics of a battery. On the other hand, excessively small amount of the conductive carbon is undesirable since it is difficult to improve electronic conductivity.

The conductive carbon may be coated over a surface of each of the first particles and the secondary particles. For example, the conductive carbon may be coated to a thickness of 0.1 to 100 nanometers over surfaces of the first particles and to a thickness of 1 to 300 nanometers over surfaces of the secondary particles.

When the first particles are coated with 0.5 to 1.5 wt % of the conductive carbon based on a total weight of the cathode active material, a thickness of the carbon coating layer may be approximately 0.1 to 2.0 nanometers.

In the present invention, the amorphous carbon is a carbon-based compound except for crystalline graphite and, for example, may be hard carbon and/or soft carbon.

The amorphous carbon may be prepared through a process including thermal-treating at 1800° C. or less. For example, the hard carbon may be prepared through thermal decomposition of a phenolic resin or a furan resin and the soft carbon may be prepared through carbonization of coke, needle coke, or pitch.

Figure 1:
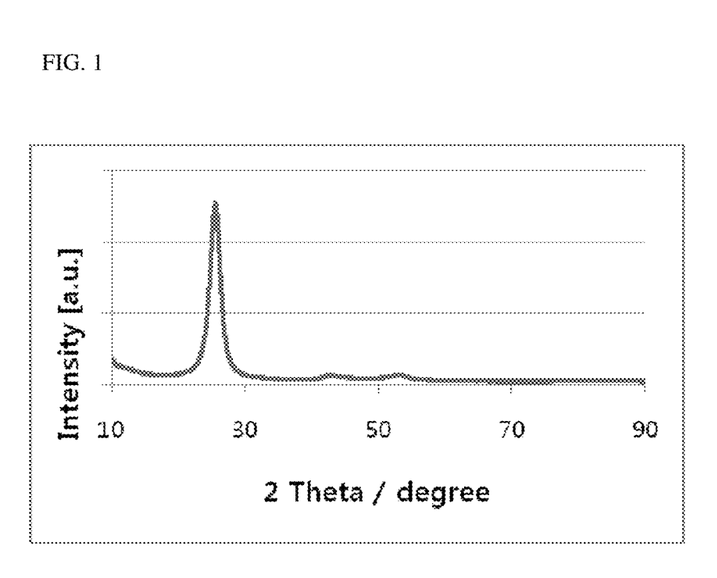
FIG. 1 is a graph illustrating an X-ray diffraction (XRD) spectrum of an anode, to which amorphous carbon according to the present invention is applied.

An X-ray diffraction (XRD) spectrum of an anode, in which the amorphous carbon was used, is illustrated in FIG. 1.

The hard carbon, the soft carbon, or a mixture thereof may be used as an anode active material. In the case of the mixture, the hard carbon and the soft carbon, for example, may be mixed in a weight ratio of 5:95 to 95:5 based on a total weight of the anode active material.

An average particle diameter of the amorphous carbon, for example, may be 0.01 to 30 micrometers and a specific surface area with respect to a capacity thereof may be 0.001 to 0.055 $m^2$/mAh.

The average particle diameter and the specific surface area with respect to capacity of the amorphous carbon are an optimal range to exhibit effects in accordance with the present invention. Accordingly, average particle diameters and specific surface areas with respect to capacity, which are greater or smaller than the range, are not desirable.

Hereinafter, a composition of the lithium secondary battery according to the present invention will be described.

The lithium secondary battery according to the present invention includes a cathode, which is prepared by coating a mixture of the cathode active material, a conductive material, and a binder on a cathode current collector and drying and pressing the coated cathode current collector, and an anode prepared using the same method as that used to manufacture the cathode. In this case, the mixture may further include a filler as desired.

The cathode current collector is generally fabricated to a thickness of 3 to 500 micrometers. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

An anode current collector is typically fabricated to a thickness of 3 to 500 micrometers. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The lithium secondary battery may have a structure in which an electrode assembly, which includes a cathode, an anode, and a separator disposed between the cathode and the anode, is impregnated with the electrolyte.

The separator is disposed between the cathode and the anode and an insulating thin film having high ion permeability and mechanical strength is used as the separator. The separator typically has a pore diameter of 0.01 to 10 micrometers and a thickness of 5 to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte, and the like may be used, but the present invention is not limited thereto.

The non-aqueous organic solvent may be at least one solvent selected from the group consisting of carbonate-based solvents, ester-based solvents, an ether-based solvent, and ketone-based solvents. In particular, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include, but are not limited to, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, lithium tetraphenyl borate, and imides. Concentration of the lithium salt in an electrolyte may be 0.5 to 3 M.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

The battery pack including one or more lithium secondary batteries described above may be used as a power source for devices that require stability at high temperature, long cycle life, and high rate characteristics.

Examples of the devices include electric vehicles, hybrid electric vehicles (HEVs), plug-in hybrid electric vehicles (PHEVs), and the like, and the secondary battery according to the present invention may be desirably used in hybrid electric vehicles due to superior output characteristics thereof.

Recently, research into use a lithium secondary battery in power storage devices, in which unused power is converted into physical or chemical energy for storage and, when necessary, the converted energy is used as electric energy, is being actively performed.

BRIEF DESCRIPTION OF THE DRAWINGS

The above and other objects, features and other advantages of the present invention will be more clearly understood from the following detailed description taken in conjunction with the accompanying drawing, in which.

MODE FOR INVENTION

Now, the present invention will be described in more detail with reference to the following examples. These examples are provided only for illustration of the present invention and should not be construed as limiting the scope and spirit of the present invention.

Example 1

86 wt % LiFePO$_4$ as a cathode active material, 8 wt % Super-P as a conductive material, and 6 wt % PVdF as a binder were added to NMP to prepare a cathode mixture slurry. The resulting cathode mixture slurry was coated, dried, and pressed over one side of aluminum foil to prepare a cathode.

93.5 wt % soft carbon as an anode active material, 2 wt % Super-P as a conductive material, and 3 wt % SBR as a binder, and 1.5 wt % CMC as a thickener were added to water as a solvent to prepare an anode mixture slurry. The resulting anode mixture slurry was coated, dried, and pressed over one side of copper foil to prepare an anode.

The cathode and the anode were laminated using Celgard™ as a separator to prepare an electrode assembly. Subsequently, a lithium non-aqueous electrolyte was added to a mixture of ethylene carbonate (EC) and dimethyl ether (DME), where a weight ratio of EC to DME was 20:80, to prepare a lithium secondary battery.

Example 2

A lithium secondary battery was prepared in the same manner as in Example 1, except that a mixture of ethylene carbonate and dimethyl ether, wherein a weight ratio of EC to DME was 30:70, was used instead of the mixture of ethylene carbonate (EC) and dimethyl ether, where a weight ratio of EC to DME was 20:80.

Example 3

A lithium secondary battery was prepared in the same manner as in Example 1, except that a mixture of ethylene carbonate and dimethyl ether, where a weight ratio of EC to DME was 40:60, was used instead of the mixture of ethylene carbonate (EC) and dimethyl ether, wherein a weight ratio of EC to DME was 20:80.

Comparative Example 1

A lithium secondary battery was prepared in the same manner as in Example 1, except that a mixture of circular carbonate and linear carbonate, in which a ratio of EC to DMC to EMC was 20:40:40, was used instead of the mixture of ethylene carbonate (EC) and dimethyl ether, wherein a weight ratio of EC to DME was 20:80.

Comparative Example 2

A lithium secondary battery was prepared in the same manner as in Example 1, except that graphite was used instead of the soft carbon, and a mixture of circular carbonate and linear carbonate, in which a ratio of EC to DMC to EMC was 20:40:40, was used instead of the mixture of ethylene carbonate (EC) and dimethyl ether, wherein a weight ratio of EC to DME was 20:80.

Comparative Example 3

A lithium secondary battery was prepared in the same manner as in Example 1, except that graphite was used instead of the soft carbon.

Comparative Example 4

A lithium secondary battery was prepared in the same manner as in Example 1, except that a mixture of propylene carbonate (PC) and dimethyl ether (DME), wherein a weight ratio of PC to DME is 20:80, was used instead of the mixture of ethylene carbonate (EC) and dimethyl ether, wherein a weight ratio of EC to DME was 20:80.

Comparative Example 5

A lithium secondary battery was prepared in the same manner as in Example 1, except that 88 wt % $LiNi_{1/3}Mn_{1/3}CO_{1/3}O_2$ as a cathode active material, instead of the cathode mixture slurry, 6.5 wt % Super-C as a conductive material, and 5.5 wt % PVdF as a binder were added to NMP, and a mixture of circular and linear carbonate, in which a ratio of EC to DMC to EMC was 20:40:40, was used as an electrolytic solvent.

Comparative Example 6

A lithium secondary battery was prepared in the same manner as in Example 1, except that 88 wt % $LiNi_{1/3}Mn_{1/3}CO_{1/3}O_2$ as a cathode active material, instead of the cathode mixture slurry, 6.5 wt % Super-C as a conductive material, and 5.5 wt % PVdF as a binder were added to NMP.

Experimental Example 1

Formation of the lithium secondary batteries manufactured according to Example 1 and Comparative Examples 1 to 3 was carried out under a condition of 0.1 C CC/CV charge→rest for 20 min→0.1 C CC discharge. Results are summarized in FIG. 2.

Figure 2:
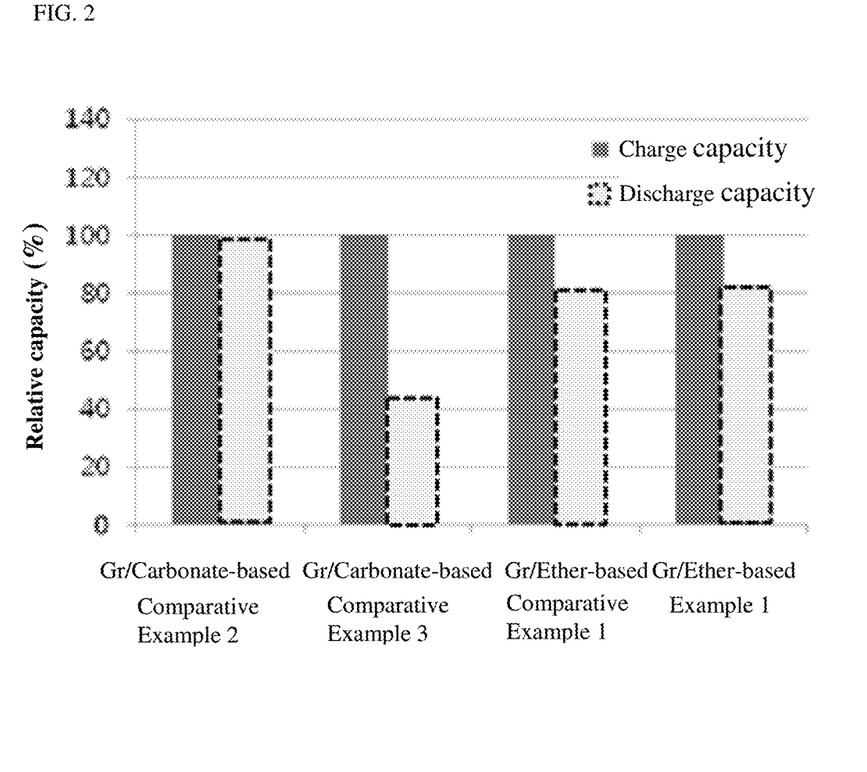
FIG. 2 is a graph illustrating a capacity result after formation of a secondary battery according to Experimental Example 1 of the present invention.

As shown in FIG. 2, the battery according to Example 1 exhibits discharge capacity almost similar to the battery according to Comparative Example 1, but the battery according to Comparative Example 3 exhibits extremely low discharge capacity, when compared with the battery according to Comparative Example 2. This phenomenon was caused by decomposition of the ether solvent due to graphite of the battery according to Comparative Example 3.

Experimental Example 2

Relative resistances of the batteries Example 1, and Comparative Examples 1 and 2 were measured under a condition of 3 cycles×(CC discharge→rest for 20 min→CC/CV charge)→rest for 30 min→9 cycles×(CC discharge at 10% SOC→rest for 1 hr→10 C discharge for 10 s→rest for 30 min→10 C charge for 10 s→rest for 30 min). Subsequently, relative outputs were measured according to an output formula below under a condition of 50% SOC. Results are summarized in FIG. 3 below.

Figure 3:
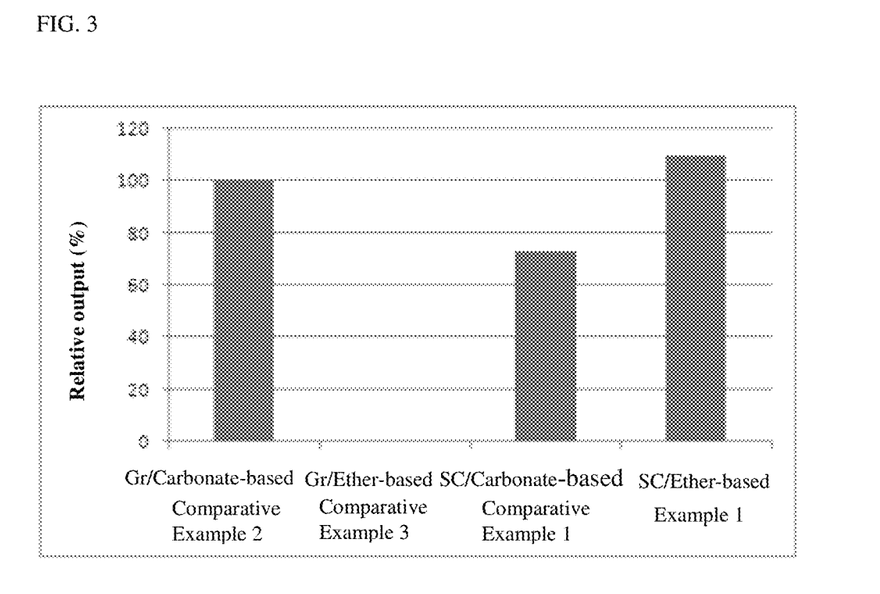
FIG. 3 is a graph illustrating room-temperature output characteristics of a secondary battery, using a cell having 70% or more coulombic efficiency according to Experimental Example 1 of the present invention.

Output formula=$OCV_{SOC50\%} \times (OCV_{SOC50\%} - Vmin)/R_{SOC50\%}$

As shown in FIG. 3, it can be confirmed that the battery according to Example 1 exhibits relatively high output, when compared with the batteries according to Comparative Examples 1 and 2. That is, when an ether-based electrolyte is used in a system using amorphous carbon as an anode, high output characteristics are exhibited.

Experimental Example 3

−30° C. low-temperature resistances of the lithium secondary batteries manufactured according to Example 1, and Comparative Examples 1 and 2 were measured at time points of 10 s and 30 s under a condition of setting to 50% SOC at room-temperature→rest for 6 hr at −30° C.→2 C-rate discharge. Subsequently, outputs at −30 were compared according to an output formula below. Results are summarized in FIG. 4 below.

Figure 4:
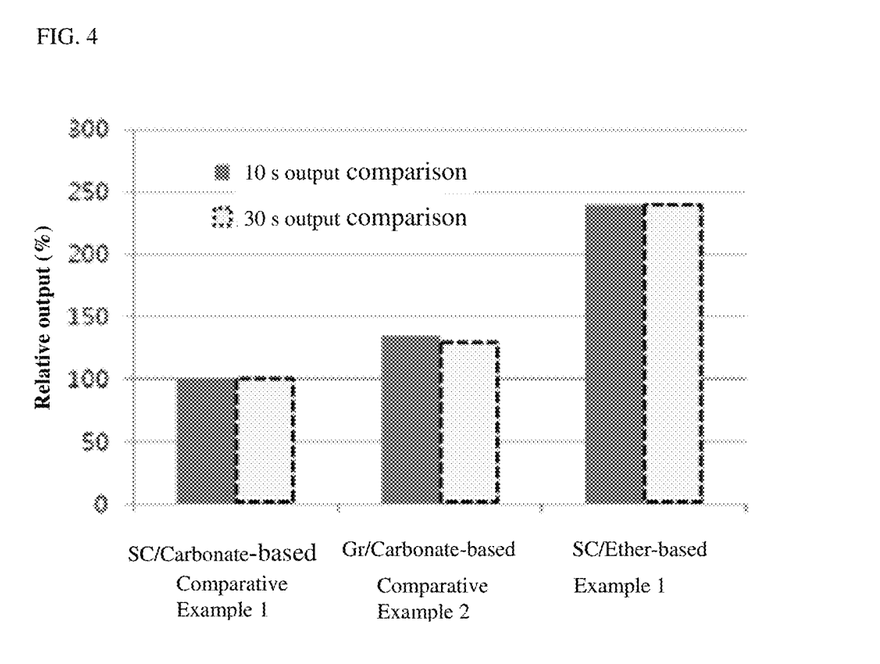
FIG. 4 is a graph illustrating low-temperature output characteristics of a secondary battery according to Experimental Example 3 of the present invention.

Low-temperature output formula=$OCV_{SOC50\%} \times (OCV_{SOC50\%} - Vmin)/R_{SOC50\%}$ As shown in FIG. 4, it can be confirmed that the battery according to Example 1 exhibits higher output characteristics at a low-temperature of −30° C. within 10 s or 30 s, when compared with batteries according to Comparative Examples 1 and 2. Generally, outputs of batteries for HEV are confirmed within 3.5 to 10 s and outputs of PHEV and EV cells are confirmed at longer time points, namely, 20 s or more. Accordingly, the secondary battery according to the present invention may be basically suitable for a secondary battery and may also be properly used in PHEVs and EVs.

Experimental Example 4

Relative resistances of the lithium secondary batteries manufactured according to Example 1 and Comparative Example 4 were measured under a condition of 3 cycles× (CC discharge→rest for 20 min→CC/CV charge)→rest for 30 min→9 cycles×(CC discharge at 10% SOC→rest for 1 hr→10 C discharge for 10 s→rest for 30 min→10 C charge for 10 s→rest for 30 min). Subsequently, relative outputs were measured according to an output formula below under a condition of 50% SOC. Results are summarized in FIG. 5 below.

Figure 5:
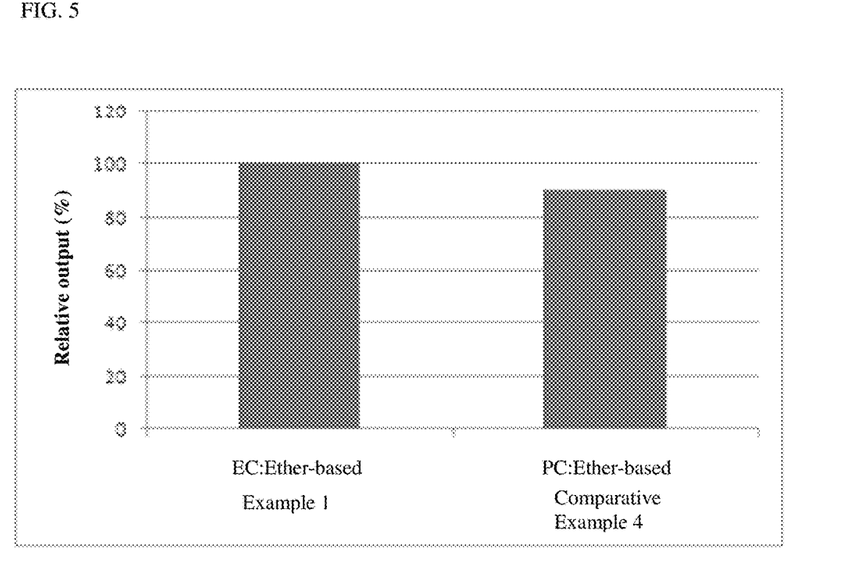
FIG. 5 is a graph illustrating room-temperature output characteristics of a secondary battery according to Experimental Example 4 of the present invention.

Output formula=$OCV_{SOC50\%} \times (OCV_{SOC50\%} - Vmin)/R_{SOC50\%}$

As shown in FIG. 5, it can be confirmed that the battery according to Example 1 exhibits relatively high output, when compared with the battery according to Comparative Example 4. That is, it can be confirmed that ethylene carbonate exhibits higher output at room temperature, when compared with propylene carbonate.

Experimental Example 5

Figure 6:
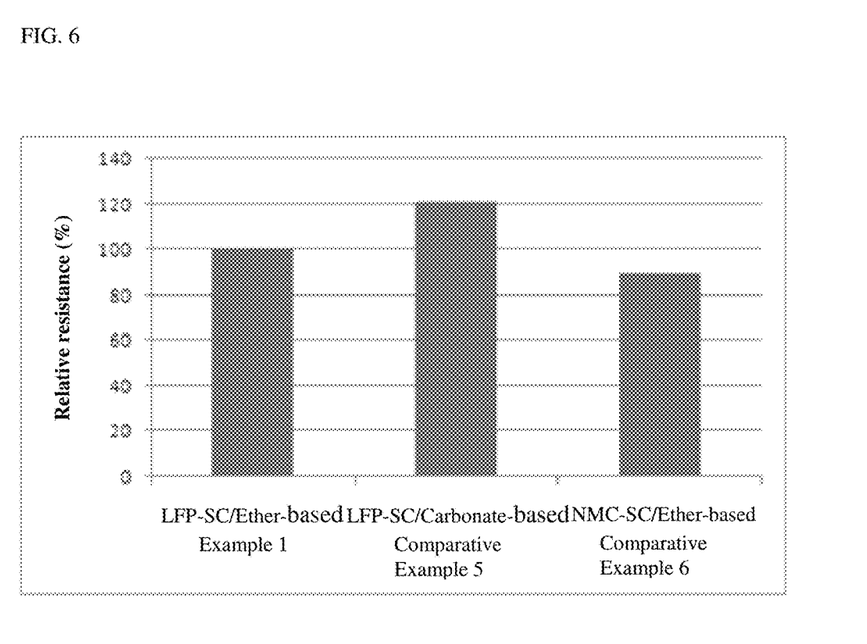
FIG. 6 is a graph illustrating room-temperature resistance characteristics of a secondary battery due to different cathode materials of a secondary battery according to Experimental Example 5 of the present invention.

Relative resistances of the lithium secondary batteries manufactured according to Example 1, and Comparative Examples 5 and 6 were measured under a condition of 3 cycles×(CC discharge→rest for 20 min→CC/CV charge)→rest for 30 min→9 cycles×(CC discharge at 10% SOC→rest for 1 hr→10 C discharge for 10 s→rest for 30 min→10 C charge for 10 s→rest for 30 min).

As shown in FIG. 6, it can be confirmed that the battery according to Example 1 exhibits relatively low resistance, when compared with the battery according to Comparative Example 5. In the case of the battery according to Comparative Example 6, low initial resistance is exhibited but performance thereof is rapidly deteriorated due to large amount of gas being generated during high-temperature storage, thereby not being useful as a battery.

Experimental Example 6

Figure 7:
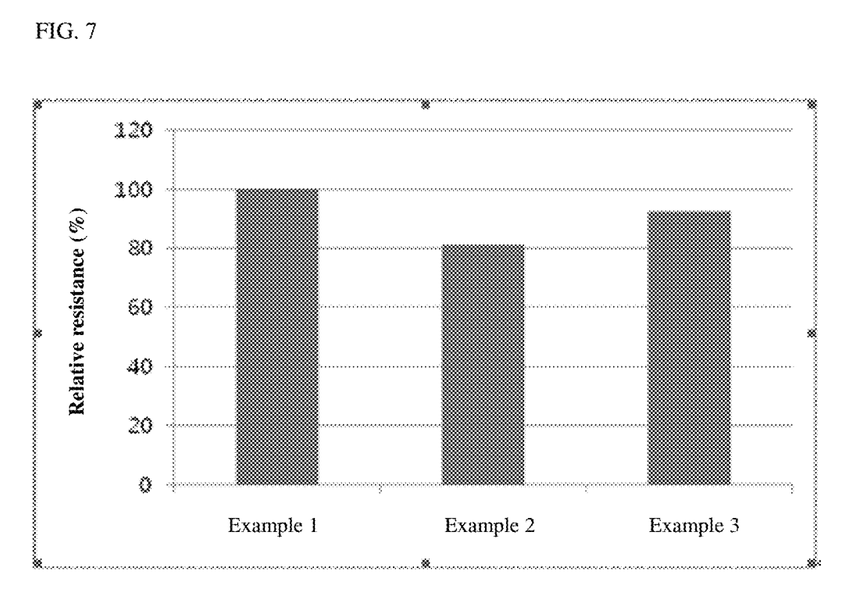
FIG. 7 is a graph illustrating room-temperature resistance characteristics of a secondary battery due to different EC amounts in an electrolyte of a secondary battery according to Experimental Example 6 of the present invention.

Relative resistances of the lithium secondary batteries manufactured according to Examples 1 to 3 were measured under a condition of 3 cycles×(CC discharge→rest for 20 min→CC/CV charge)→rest for 30 min→9 cycles×(CC discharge at 10% SOC→rest for 1 hr→10 C discharge for 10 s→rest for 30 min→10 C charge for 10 s→rest for 30 min).

As shown in FIG. 7, it can be confirmed that a room-temperature resistance reduces and, again, increases according to increase in a content of EC.

INDUSTRIAL APPLICABILITY

As described above, a secondary battery according to the present invention includes predetermined lithium metal phosphate, amorphous carbon, and a non-aqueous ether-based electrolyte, and thus may prevent decomposition of an electrolyte, thereby exhibiting superior room temperature and low-temperature output characteristics. Therefore, the secondary battery according to the present invention may be properly used in hybrid electric vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising:
a cathode active material comprising lithium metal phosphate according to Formula 1 below;
an anode active material comprising amorphous carbon, wherein the anode active material does not contain crystalline graphite; and
an electrolyte for lithium secondary batteries comprising a lithium salt and an electrolytic solvent, wherein the electrolytic solvent consists of an ether-based solvent and an ethylene carbonate (EC), wherein a content of the ethylene carbonate is from 1 to 80 wt % based on a total weight of the electrolyte, $$Li_{1+a}M(PO_{4-b})X_b \quad (1)$$

wherein M is at least one selected from the group consisting of Group II to XII metals; X is at least one selected from F, S, and N, $-0.5 \leq a \leq +0.5$, and $0 \leq b \leq 0.1$.

2. The lithium secondary battery according to claim 1, wherein the content of the ethylene carbonate (EC) is from 20 to 60 wt % based on a total weight of the electrolyte.

3. The lithium secondary battery according to claim 1, wherein the ether-based solvent is at least one selected from the group consisting of tetrahydrofuran, 2-methyltetrahydrofuran, dimethyl ether, and dibutyl ether.

4. The lithium secondary battery according to claim 1, wherein the ether-based solvent is dimethyl ether.

5. The lithium secondary battery according to claim 1, wherein the lithium salt is at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiPF$_6$, LiAlCl$_4$, CH$_3$SO$_3$Li, CF$_3$SO$_3$Li, (CF$_3$SO$_2$)$_2$NLi, chloroborane lithium, 4-phenylboronic acid lithium, and imides, and a concentration of the lithium salt is 0.5 to 3 M in the electrolyte.

6. The lithium secondary battery according to claim 1, wherein the lithium metal phosphate is a lithium iron phosphate having an olivine crystal structure according to Formula 2 below:

$$Li_{1+a}Fe_{1-x}M'_x(PO_{4-b})X_b \quad (2)$$

wherein M' is at least one selected from Al, Mg, Ni, Co, Mn, Ti, Ga, Cu, V, Nb, Zr, Ce, In, Zn, and Y,
X is at least one selected from F, S, and N, and
$-0.5 \leq a \leq +0.5$, $0 \leq x \leq 0.5$, and $0 \leq b \leq 0.1$.

7. The lithium secondary battery according to claim 6, wherein the lithium iron phosphate having the olivine crystal structure is LiFePO$_4$.

8. The lithium secondary battery according to claim 1, wherein the amorphous carbon is hard carbon and/or soft carbon.

9. A battery module comprising the lithium secondary battery according to claim 1 as a unit battery.

10. A battery pack comprising the battery module according to claim 9.

11. A device comprising the battery pack according to claim 10.

12. The device according to claim 11, wherein the device is a hybrid electric vehicle, plug-in hybrid electric vehicle, or a system for storing power.

* * * * *